United States Patent [19]
Haque

[11] Patent Number: 5,577,010
[45] Date of Patent: Nov. 19, 1996

[54] APPARATUS FOR RETRIEVING AND PLAYING A PLURALITY OF DISCS

[76] Inventor: Shuja Haque, 2104 Shermer Rd., Northbrook, Ill. 60062

[21] Appl. No.: 398,407

[22] Filed: Mar. 3, 1995

Related U.S. Application Data

[63] Continuation of Ser. No. 27,184, Mar. 5, 1993, abandoned.

[51] Int. Cl.⁶ ................................. G11B 17/28
[52] U.S. Cl. ........................... 369/36; 369/37; 360/98.05
[58] Field of Search ................................ 369/34, 36, 37, 369/38, 75.1, 75.2, 77.1, 77.2, 178, 258, 191, 192, 202, 204, 235, 249, 271; 414/416, 417; 360/98.04, 98.05, 98.06

[56] References Cited

U.S. PATENT DOCUMENTS

| | | | |
|---|---|---|---|
| 2,610,858 | 9/1952 | Kenney | 369/192 |
| 4,674,077 | 6/1987 | Yoshimoto et al. | 369/37 |
| 4,979,160 | 12/1990 | Araki | 369/75.2 |
| 5,187,695 | 2/1993 | Schindler et al. | 369/37 |
| 5,214,628 | 5/1993 | Langman et al. | 369/37 |
| 5,292,222 | 3/1994 | Malagrino, Jr. et al. | 414/786 |

FOREIGN PATENT DOCUMENTS

| | | | |
|---|---|---|---|
| 60-201566 | 12/1985 | Japan | 360/99.06 |

*Primary Examiner*—Stuart S. Levy
*Assistant Examiner*—William J. Klimowicz
*Attorney, Agent, or Firm*—Wallenstein & Wagner, Ltd.

[57] ABSTRACT

An apparatus (14) for retrieving and loading disc-shaped objects including CD's (16) onto a CD player (20), such as for a CD juke box (10), is disclosed. The apparatus (14) retrieves an awaiting CD (16) from a loading station (18) and places the retrieved CD (16) onto a CD player (20). The apparatus (14) further returns the CD (16) from the player (20) to the loading station (18). The apparatus (14) comprises a pair of spaced, generally parallel tracks (24) adapted to generally straddle the CD player (20) and the loading station (18), and a pair of arms (30). A respective one of the arms (30) is associated with a respective one of each of the tracks (24). A motor (34) and gear (36) assembly moves the arms (30) in tandem along the tracks (24) between an extended position, an intermediate position and a retracted position. The retracted position is substantially in-line with the CD player (20). The extended position is substantially in-line with the loading station (18). The arms (30) move apart as they reach the loading station (18) to pass the awaiting CD (16), the arms (30) move together as the arms (30) begin to move to the intermediate position to grasp the periphery of the awaiting CD (16), and the arms (30) move apart as the arms (30) reach the retracted position to place the CD (16) onto the CD player (20).

11 Claims, 6 Drawing Sheets

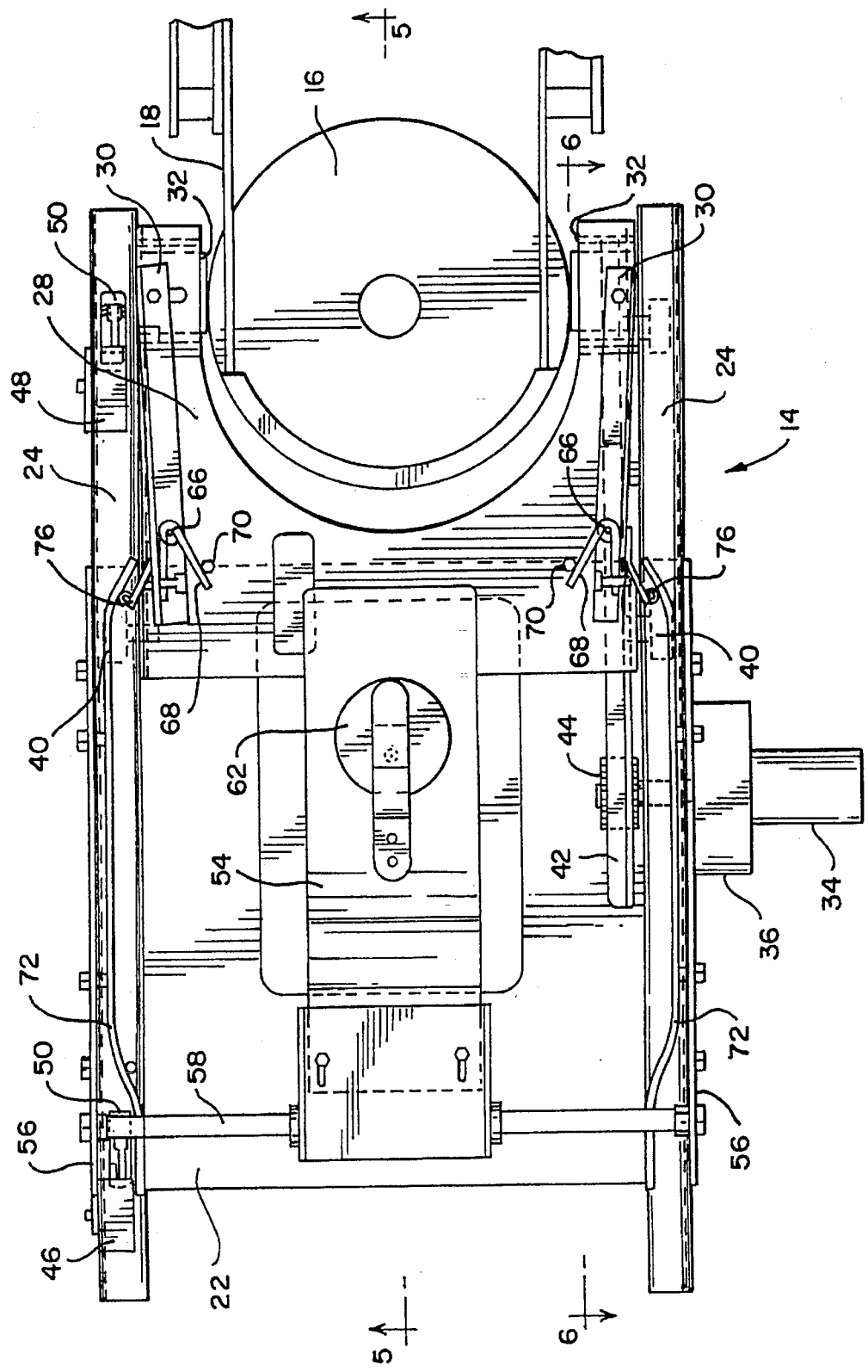

APPARATUS FOR RETRIEVING AND PLAYING A PLURALITY OF DISCS

This is a continuation of application Ser. No. 08/027,184, filed on Mar. 5, 1993, now abandoned.

DESCRIPTION

1. Technical Field

The invention relates to an apparatus for selectively retrieving and playing or reading a plurality of disc-shaped objects like CD's, such as for a compact discs, (or CD's) juke box.

2. Background Prior Art

Compact discs have become a common medium for storage of information, whether the information is prerecorded music, data to be utilized by a computer, or the like. Often it is necessary to select a CD from a group of CD's, such as carried by a carousel. This could be for a juke box that contains many CD's having many prerecorded musical selections, or it could be for a computer system which needs to selectively access data stored on a plurality of CD's. In either case, it is necessary that the desired CD can be easily retrieved without damaging the compact disks.

The present invention is provided to solve this and other problems.

SUMMARY OF THE INVENTION

It is an object of the invention to provide a an apparatus for retrieving an awaiting CD from a loading station, and placing the retrieved CD onto a CD player, and for returning the CD from the player to the loading station. It is contemplated that the subject invention may be used for other disc-shaped objects such as vinyl recordings or CD ROM discs. Accordingly, the invention may be used with CD players, disc drives or other disc reading devices.

In accordance with the invention, the apparatus comprises a pair of spaced, generally parallel tracks adapted to generally straddle the CD player and the loading station. The apparatus further comprises a pair of arms. A respective one of the arms is associated with a respective one of each of the tracks. Means, such as a gear reducer and a motor, are provided for moving the arms in tandem along the tracks among an extended position, an intermediate position and a retracted position. The retracted position is substantially in-line with the CD player and the extended position is substantially in-line with the loading station. Means are further provided for biasing the arms outwardly when the arms are in the extended and the retracted positions and for biasing the arms inwardly when the arms are in the intermediate position. As a result of the biasing, the arms move apart as they reach the loading station to pass the awaiting CD, the arms move together as the arms begin to move toward the intermediate position to grasp the periphery of the awaiting CD, and the arms move apart again as the arms reach the retracted position to drop the CD onto the CD player.

It is contemplated that means are provided for sensing the position of the arms. Further, means responsive to the sensing means stop movement of the arms when the arms reach the extended position, and additional means responsive to the sensing means stop movement of the arms when the arms reach the retracted position.

It is also further contemplated to provide means for biasing the CD against the CD player after the CD has been dropped onto the CD player. Accordingly, first and second frame members are provided, a respective one being disposed outwardly of a respective one of each of the tracks. The CD biasing means comprises a flap pivotally supported between the first and second frame members and adapted to engage the CD. The flap includes means for limiting downward travel of the flap and means, such as a magnet, or similar pressure applying device, adapted for holding the CD in place when the CD player is activated.

It is still further contemplated that the biasing means comprises first and second rails. A respective one of each of the rails extends along a portion of a respective one of each of the tracks. Each of the tracks provides an inwardly facing camming surface. Each of the arms includes a cooperating surface which engages the respective one of the camming surfaces.

Other features and advantages of the invention will be apparent from the following specification taken in conjunction with the following drawings.

BRIEF DESCRIPTION OF DRAWINGS

FIG. 3 is a top view of the subject loading apparatus in the extended position;

DETAILED DESCRIPTION

Figure 2:
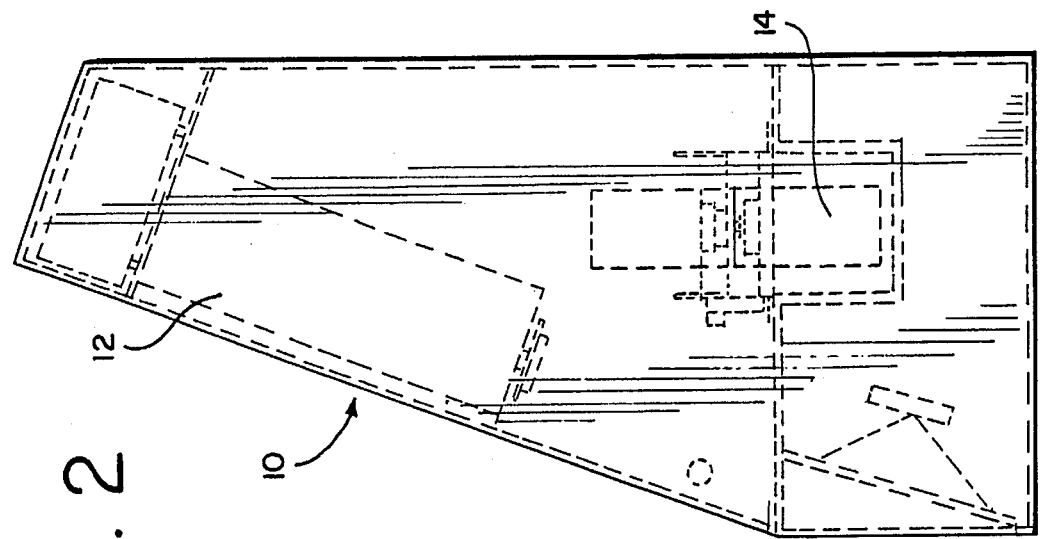
FIG. 2 is a side elevational view of the CD juke box shown in FIG. 1.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 1:
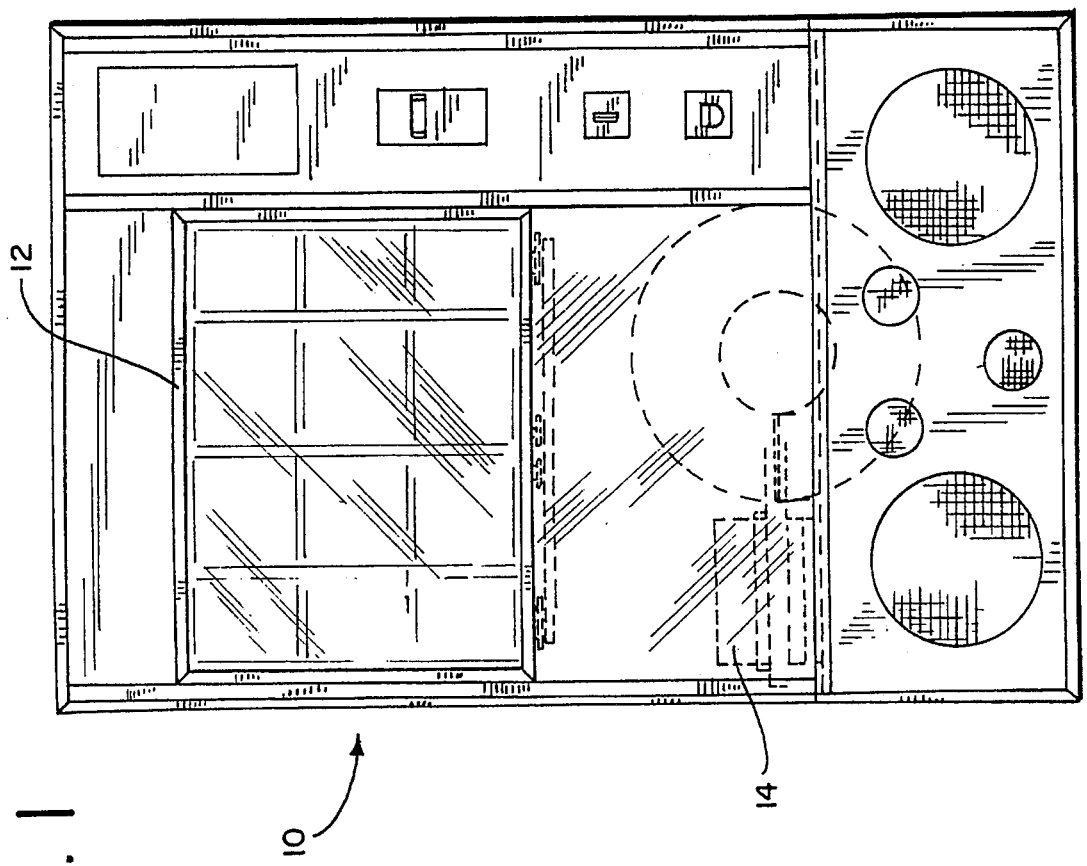
FIG. 1 is a front elevational view of a compact disc juke box containing the subject invention.
Figure 4:
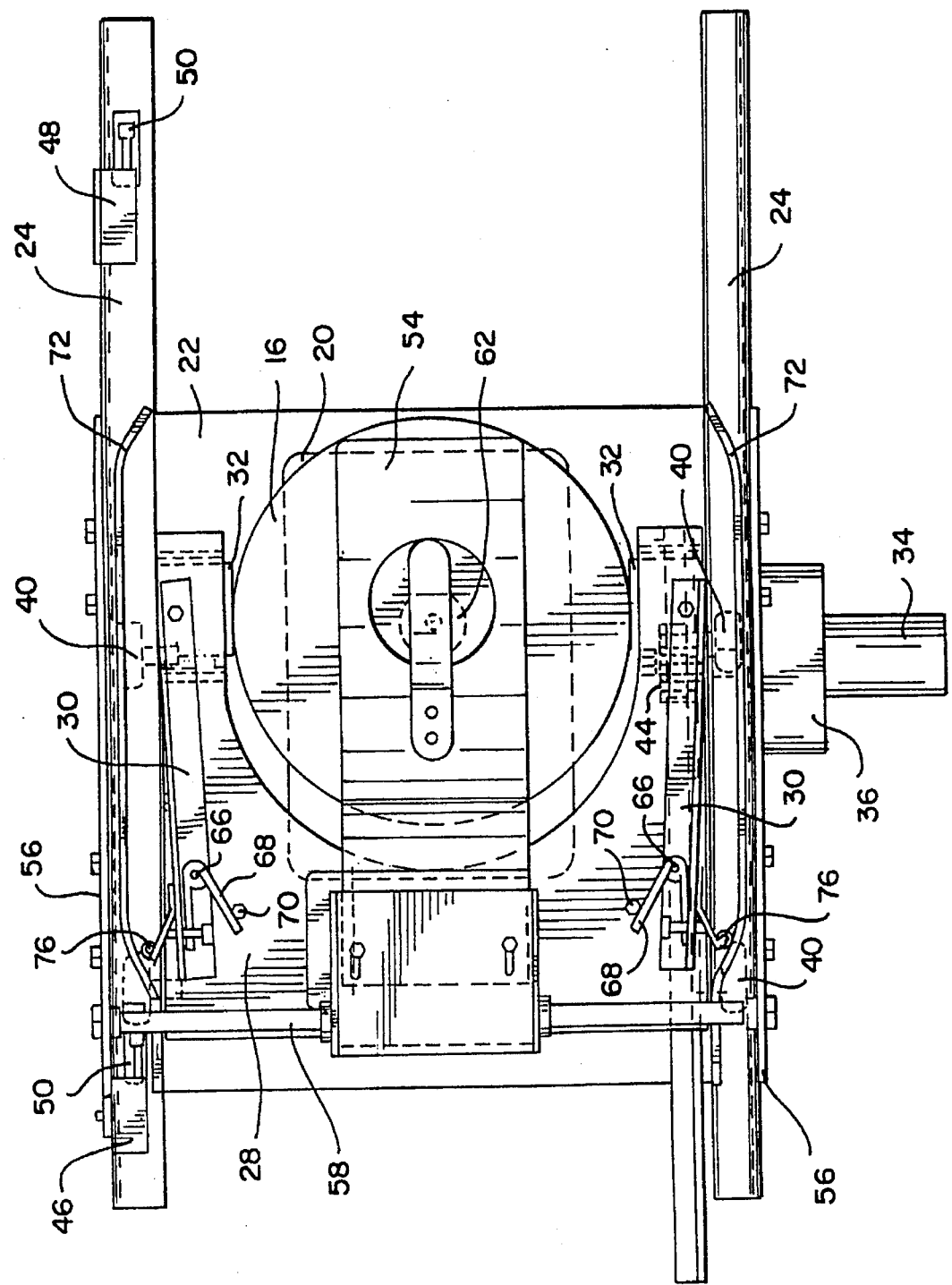
FIG. 4 is a top view of the subject loading apparatus in the retracted position.
Figure 5:
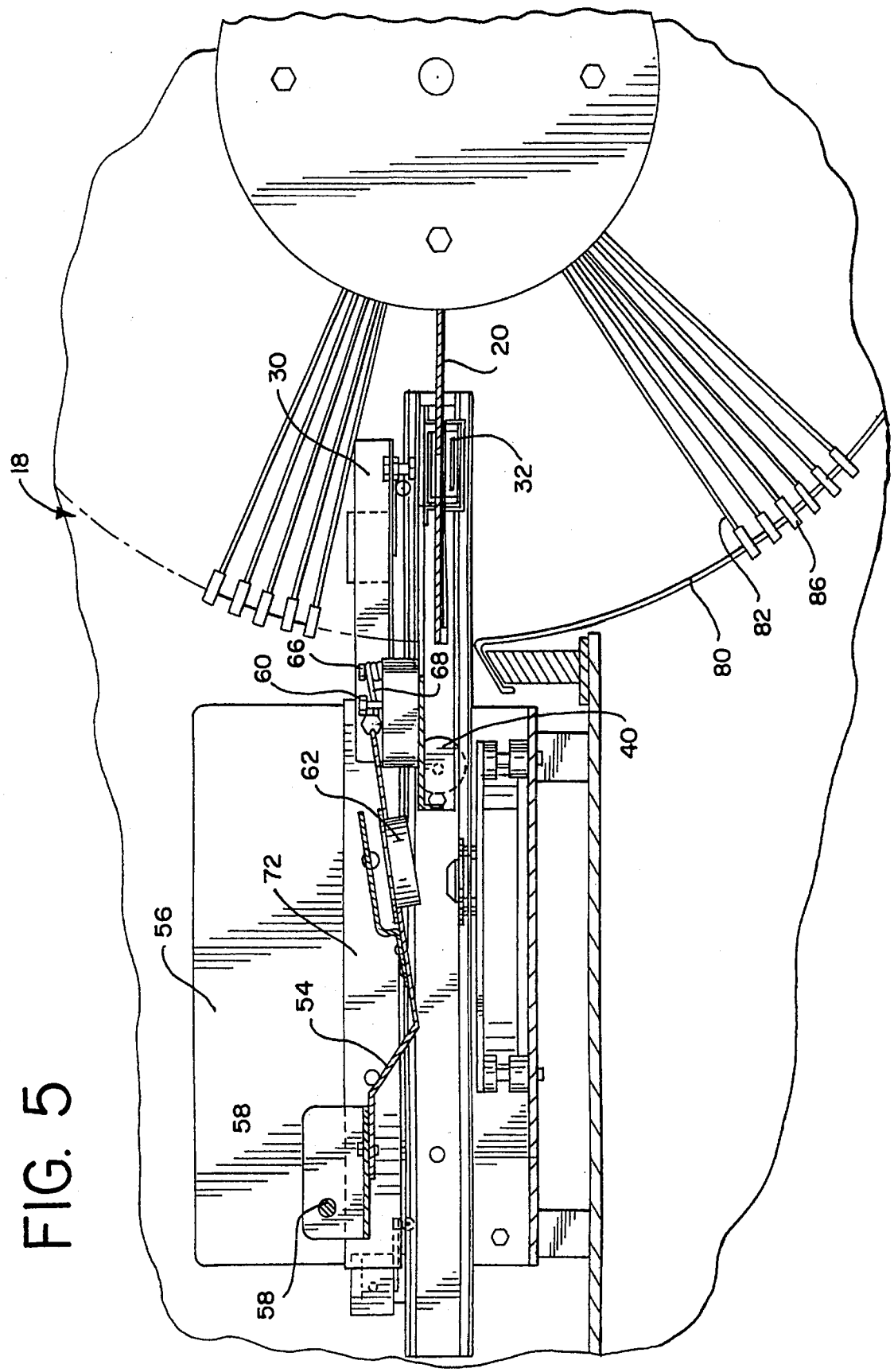
FIG. 5 is a side view of the subject loading apparatus in the extended position taken along lines 5—5 of FIG. 3.

A juke box 10 for selectively playing a plurality of CD's is illustrated in FIGS. 1 and 2. The juke box 10 is generally of conventional design, but for a novel display apparatus 12 and a novel apparatus, generally designated 14, for retrieving an awaiting CD 16 from a loading station 18 and placing the retrieved CD onto a CD player 20, and for returning the CD 16 from the CD player 20 to the loading station 18.

The display apparatus 12 is described in detail in co-pending patent application Ser. No. 08/027,176, filed Mar. 5, 1993, the specification of which is expressly incorporated herein. The CD retrieving and loading apparatus 14 is the subject matter of this application and is described in detail below.

The apparatus for retrieving an awaiting CD from a loading station, and placing the retrieved CD onto a CD player, and for returning the CD from the player to the loading station, which will be referred to herein simply as the loading apparatus 14, is illustrated in FIGS. 3–7.

Figure 8:
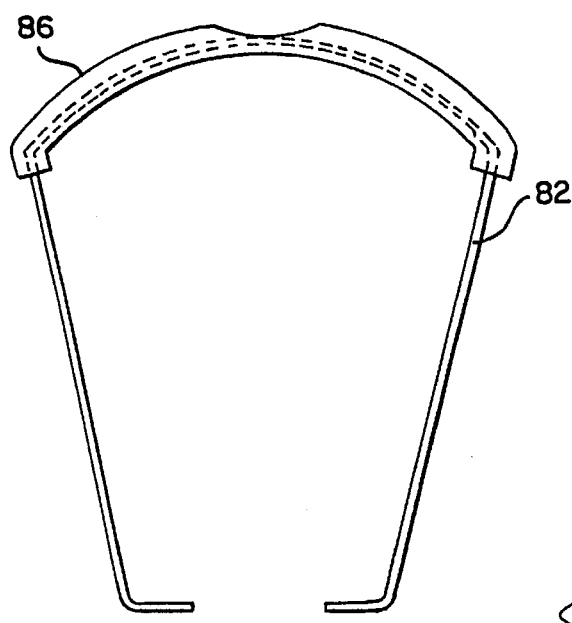
FIG. 8 is a top view of the spoke in the loading station.
Figure 9:
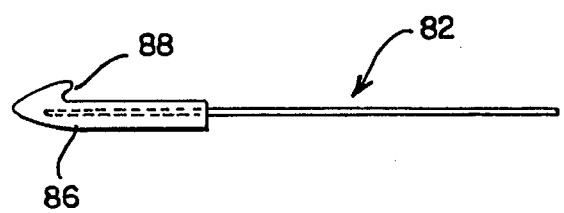
FIG. 9 is a side view of the spoke in the loading station.
Figure 10:
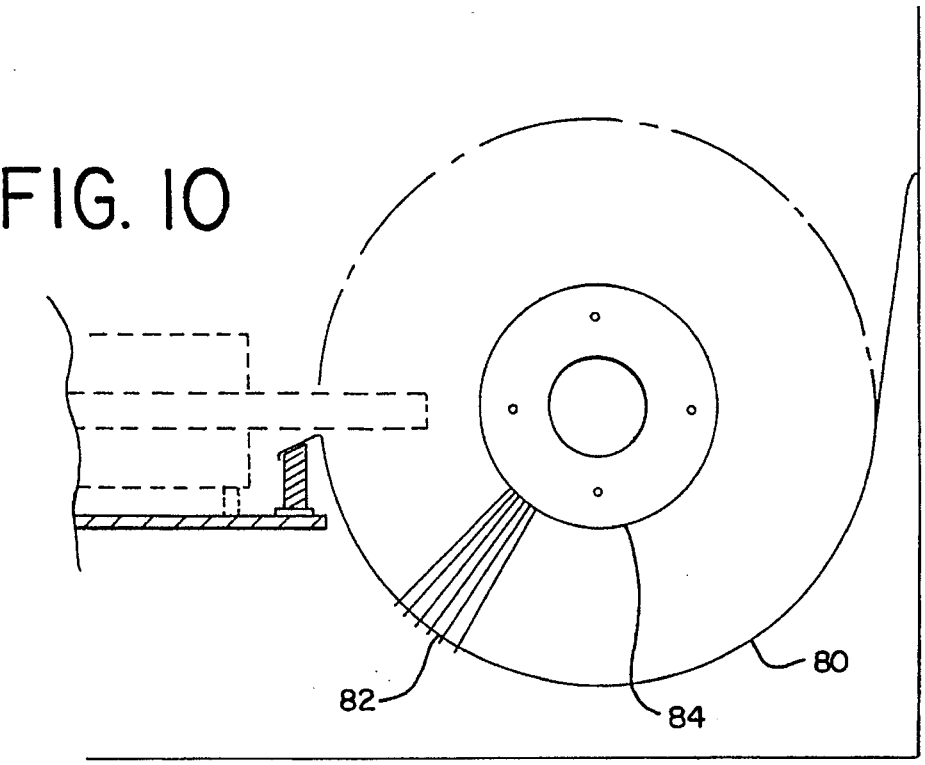
FIG. 10 is a side view of the loading station.

The loading station 18 is a CD carousel which is vertically disposed within the juke box 10. The loading station 18 is adapted to hold a multitude of up to 103 CDs 16. In the present invention, the loading station 18 is shown in a vertical position such that a selected CD 16 is in a horizontal position when the CD 16 is retrieved from and returned to the loading station 18. The loading station 18 consists of numerous essentially U-shaped rigid spokes 82 that are attached to a center hub 84 in a 360° arrangement. The CDs are held between two spokes 82. The spokes 82 have an outside curvature that is consistent with the circumference of a CD to facilitate the retention of the CD. A band 80 circumferentially surrounds part of the loading station 18. See FIG. 10. Said band 80 supports the loading station 18 and also functions to retain those CDs positioned in the lower half of the loading station 18. As shown in FIG. 8, the spokes 82 contain an indentation on their outside edge to accommodate the band 80. The outside portion of each spoke 82 is encapsulated in molded plastic 86. The molded plastic 86 is formed such that the outer edge is at a downward slope to the loading apparatus. See FIG. 9. The downward slope facilitates the return of the CD to the loading station 18. The molded plastic also contains a lip or ridge 88 that serves to retain the CD in the loading station 18.

The CD player 20 is a conventional CD player, such as a CDM 4 Industrial, distributed by Phillips.

Figure 7:
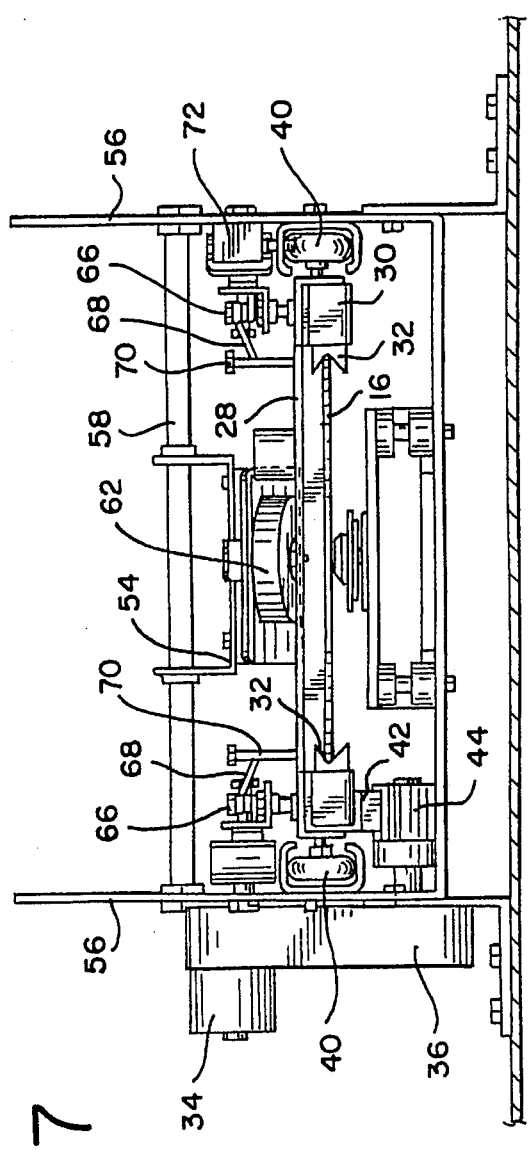
FIG. 7 is a front view of the subject loading apparatus.

The loading apparatus 14 includes a support surface 22 (See FIG. 3) adapted to support the CD player 20. The loading apparatus further includes a pair of c-shaped, spaced, generally parallel tracks 24 in spaced relation and disposed above the support surface. The tracks 24 generally straddle the CD player 20 and the loading station 18. A transfer mechanism 28 extends between and rides along the tracks 24. The transfer mechanism 28 includes a pair of pivotally operative arms 30. A respective one of the arms 30 is associated with a respective one of the tracks 24. Each of the arms 30 includes a gripping portion 32 adapted to cooperatively engage and release the CD 16. The gripping portion 32 is generally v-shaped in cross-section, as shown in FIG. 7.

A conventional DC motor 34 coupled via a conventional gear reducer 36 moves the transfer mechanism 28 along the tracks 24 between an extended position, an intermediate position and a retracted position. The transfer mechanism 28 is shown in the extended position in FIG. 3 and in the retracted position in FIG. 4. The retracted position is substantially in-line with the CD player 20. The extended position is substantially in-line with the loading station 18. The intermediate position is intermediate the retracted position and the extended position.

As discussed in greater detail below, the gripping portions 32 are forced outwardly when the arms 30 are in the extended and the arm gripping portions 32 are biased inwardly when the arms are in the intermediate position to confront diametrically opposite sides of the CD. The arm gripping portions 32 are moved apart as they reach the loading station 18 to pass the awaiting CD 16. The arm gripping portions 32 move together as the arms 30 begin to move toward the intermediate position to grasp the periphery of the awaiting CD 16 to move the CD 16 from the loading station 18. Finally, the arm gripping portions 32 move apart as the arms 30 reach the retracted position to drop the CD 16 onto the CD player 20.

Figure 6:
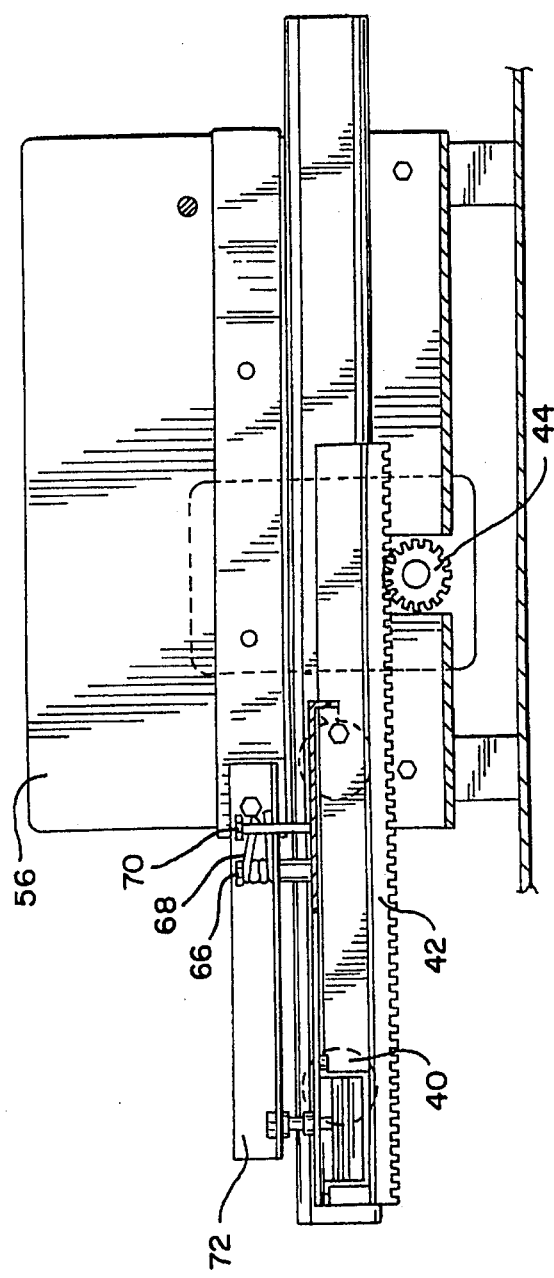
FIG. 6 is a side view of the subject loading apparatus taken along lines 6—6 of FIG. 3.

The arms 30 are carried by the transfer mechanism 28, which extends across and is carried along the tracks 24. The transfer mechanism 28 has two opposing sets of two rollers 40. Each set of two rollers 40 rolls along and is secured within a c-shaped channel formed by each of the c-shaped tracks, as shown in FIG. 7. As illustrated in FIG. 6, a geared rack 42 is disposed along one side of the transfer mechanism 28. A pinion gear 44 extends inwardly from the gear reducer 36 and the motor 34. The pinion gear 44 cooperates with the geared rack 42 to cause the transfer mechanism 28, and hence the arms 30, to selectively move between the extended, the intermediate and the retracted positions.

First and second limit switches 46,48 (See FIG. 4) cooperate through opening 50 in the track 24 with the second set of rollers 40 to sense when the transfer mechanism 48 has reached either of the extended or retracted positions. Actuation of the first or second limit switches 46,48 stops movement of the transfer mechanism in that direction.

After the CD 16 has been dropped onto the CD player 20, a flap 54 biases the CD 16 against the CD player to maintain the CD 16 on the CD player 20. Specifically, first and second frame members 56 are disposed outwardly of a respective one of each of the tracks 24. A pivot rod 58 extends between the frame members 56. The flap 54 is pivotally supported between the first and second frame members 56 by the pivot rod 58. A limit pin 60 supported by the transfer mechanism 28 (See FIG. 5) limits downward travel of the flap 54, hence limiting the force applied by the flap 54 on the CD 16. The flap further includes a magnet 62, for holding the CD 16 in place when the CD player is activated. The magnet 62 rotates freely relative to the flap 54, and is attracted to the CD player 20, and thus does not affect the playing of the CD 16. A pressure-applying device such as a gravitational weight or a piece with a spring clip, not shown, may be used in place of the magnet 62.

The arms 30 are each pivotally joined to the transfer mechanism 28 by a respective pivot pin 66 (See FIG. 8). Biasing springs 68 extend from each of the pivot pins and have terminations 66a engaging respective fixed pins 70. The biasing springs 68 pivot the arms 30 relative to the pivot pins 66, thereby biasing the arm gripping portions 32 inwardly. This inward bias causes the gripping portions 32 to hold the CD 16 when the arms 30 are in the intermediate position. To oppose this bias, in order to spread the arm gripping portions 32 when in the extended and retracted positions, first and second rails 72 are provided. A respective one of each of the rails extends above and along a portion of a respective one of each of the tracks 24. Each of the arms 30 includes an outwardly oriented bias roller 76, which cooperatively engage respective ones of the camming surfaces 73 on the rails to move the arm gripping portions 32 outwardly when the transfer mechanism 28 is in either of the retracted or extended positions.

It will be understood that the invention may be embodied in other specific forms without departing from the spirit or central characteristics thereof. The present example and embodiment, therefore, is to be considered in all respects as illustrative and not restrictive, and the invention is not to be limited to the details given herein.

I claim:

1. An apparatus for selectively retrieving a CD in a generally horizontal plane at a loading station of a storage unit which holds a plurality of CDs for movement one at a time to said loading station, delivering the same to a loading station of a CD player and then returning the CD to said loading station of said storage unit, the apparatus comprising:

transfer means and first and second spaced CD gripping portions on said transfer means, said gripping portions being in spaced confronting relation and movable relative to the transfer means between relative outer and inner positions, in said relative inner position said gripping portions gripping diametrically opposite points of a CD in said horizontal plane at said loading station of said storage unit and in said relative outer position being unable to grip the CD, said transfer means being movable with said gripping portions carried thereon, a pair of guide means, positioned to generally straddle said CD player and said loading station of the storage unit guide said transfer means and said gripping portions carried thereby for movement between spaced extended and retracted positions in a first direction generally transverse to the direction said gripping portions are spaced apart, said gripping portions being generally aligned with diametrically opposite points of a horizontally oriented CD at said loading station of the storage unit when said transfer means and gripping portions thereon are in said extended position and being above and generally aligned with said loading station of said CD player where the CD is generally in a horizontal plane when said transfer means and gripping portions thereon are in said retracted position;

means for moving said transfer means and spaced gripping portions back and forth in said first direction between said extended and retracted positions and, positioning cam means associated with said guide means, for moving said gripping portions to said inner position to grip said CD at said loading station of said storage unit when said transfer means and gripping portions thereon are in said extended position and in intermediate positions between said extended and retracted positions and for moving said gripping portions to said relative outer position to release said gripping portions from engagement with a CD so that it is dropped upon said loading station of the CD player when said transfer means and gripping portions thereon are in said retracted position, and so that said CD is dropped upon the loading station of the storage unit when said transfer means and gripping portions are in said extended position.

2. The apparatus of claim 1 including means for sensing the position of said transfer means in said extended and retracted positions and means responsive to said sensing means for stopping movement of said transfer means when said gripping portions reach said extended and retracted positions.

3. The apparatus of claim 1 including means for biasing said CD against said CD player after said CD has been placed onto said CD player.

4. The apparatus of claim 3 including first and second frame members, a respective one disposed outwardly of a respective one of each of said guide means, and wherein said CD biasing means comprises a flap pivotally supported between said first and second frame members and adapted to engage said CD.

5. The apparatus of claim 4 wherein said CD biasing means comprises means for limiting downward travel of said flap.

6. The apparatus of claim 4 wherein said flap includes means adapted for holding said CD in place.

7. The apparatus of claim 6 wherein said holding means comprises a magnet.

8. The apparatus of claim 1 wherein said pair of guide means comprises first and second rails, a respective one of each extending along a portion of a track coupled to each of said positioning cam means, each of said tracks providing a camming surface, and wherein each of said gripping portions includes an arm, wherein said arms include a cooperating surface which engages a respective one of said camming surfaces.

9. The apparatus of claim 1 wherein said positioning cam means includes spring biasing means for continuously biasing said gripping portions together to a point where they can grip said CD at said loading station of said storage unit and when moved therefrom to said loading station of said CD player;

and bias-overcoming means at and adjacent to said loading stations of said storage unit and CD player for progressively moving said gripping portions apart to a point where they are spaced apart a greater distance than the diameter of the CD's against the force exerted by said spring biasing means as said gripping portions on said transfer means are moved to a point where the CD is aligned with said loading stations of said CD player and said storage unit.

10. The apparatus of claim 1 combined with said storage unit and said CD player.

11. The apparatus of claim 1 wherein said gripping portions have V-shaped slots which in said relative inner position of said gripping portions receive the diametrically opposite points of a CD and hold the same at the apexes of said slots, to clear interfering portions of said storage unit and CD player, until released from the CD by the outward movement of said gripping portions to said relative outer position.

* * * * *